(a)

(b)  (d)

(c)  (e)

Inventor
KUNIKI SEINO
By Stanley Wolder
Attorney

Inventor
KUNIKI SEINO
By Stanley Wolder
Attorney

3,671,104
METHOD AND APPARATUS FOR MASKING IMAGES BY POLARIZATION
Kuniki Seino, Amagasaki, Japan, assignor to Minolta Camera Kabushiki Kaisha, Osaka, Japan
Filed Nov. 12, 1970, Ser. No. 88,778
Int. Cl. G02b 27/28
U.S. Cl. 350—157      9 Claims

ABSTRACT OF THE DISCLOSURE

Two doubly refracting plates whose optic axes are at 45° with each other and an image-bearing film are placed between two optical polarizers which are so disposed that their optic axes (principal crystallographic axes) are rotatable. By rotating the optical polarizers, the polarizers are set at such position that their optic axes are at a right angle or in parallel with each other, while at the same time either one of the optical polarizers and either one of the doubly refracting plates are set in such position that their optic axes are at an angle of 45° with each other. Thus, part of the image can be masked as desired.

BACKGROUND OF THE INVENTION

The present invention relates to a method and an apparatus for masking images by polarization, more particularly to a method and an apparatus for use with reader-printers, teaching machines and the like for masking images in a varying form by disposing doubly refracting transparent plates or films between two optical polarizers so as to vary the relative angle between the optic axes of these three elements.

It is generally known that when a substance exhibiting double refraction is disposed between two optical polarizers whose optic axes are at a right angle with each other, the polarized light produced upon natural light passing through the first polarizer can pass through the second polarizer depending upon the relative angle between the optic axis of the substance and those of the polarizers. Such phenomenon is supposedly attributed to the mutual interference of two kinds of light, different in phase, into which the polarized light has been transformed while passing through the doubly refracting substance. Between the intensity $Ia$ of light incident on the above-mentioned substance and the intensity $Ip$ of light passing through the second polarizer, there is the following relationship:

$$Ip = Ia \; \sin^2 2\theta \; \sin^2 \frac{\delta}{2} \quad (1)$$

wherein $\theta$ is an angle defined by the optic axis of the first polarizer and the optic axis of the doubly refracting substance and $\delta$ is phase difference between the two kinds of light, $\delta$ being given by:

$$\delta = \frac{2\pi}{\lambda} \cdot d(n_1 - n_2)$$

wherein $\lambda$ is the wavelength of the light, $n_1$ and $n_2$ are refractive indexes of the doubly refracting substance for the two kinds of light, $d$ is the thickness of the doubly refracting substance, and $d(n_1 - n_2)$ is referred to as retardation.

It will be apparent from the Equation 1 that if the angle $\theta$ between the optic axis of the first polarizer and that of the doubly refracting substance is 45°, the intensity of the light passing through the second polarizer will be greatest and that if the angle $\theta$ is 0°, the intensity will be zero, namely no light passes through the polarizer, in which case the provision of the doubly refracting substance produces no effects.

On the other hand, it is known that the following relationship is established when the optic axes of the two polarizers are in the same direction.

$$Ip = Ia \left( 1 - \sin^2 \theta \cdot \sin^2 \frac{\delta}{2} \right) \quad (2)$$

wherein the respective reference characters have the same significance as above. In sharp contrast with the relation shown by Equation 1, the Equation 2 shows that when $\theta$ is 0°, $Ip$ is greatest, while if $\theta$ is 45°, $Ip$ is zero.

Accordingly when a doubly refracting transparent substance having suitable retardation is disposed between two optical polarizers whose optic axes are arranged at a right angle or in parallel with each other in such relation that the optic axis of the former is at 45° with the optic axes of the latter, the phenomena or effects achieved are exactly the reverse of those resulting from the relative angle between the optic axes of the polarizers when only two polarizers are provided. That is, when the axes of the polarizers are parallel, light is intercepted, whereas when the axes are at a right angle, transmission of a maximum amount of light is attained. Thus, if the areas of the polarizers in facing relationship with each other are partly covered with a doubly refracting transparent substance having the foregoing relationship with respect to the optic axes, the other areas in direct facing relationship without presence of the doubly refracting transparent substance will be masked when the optic axes of the polarizers are at a right angle; the areas providing the substance therebetween will be masked when the optic axes of the polarizers are parallel; and the doubly refracting transparent substance will not produce any effect on the masking property of the polarizers when the optic axis of the substance is in parallel with the optic axis of either one of the polarizers.

SUMMARY OF THE INVENTION

An object of the present invention is to provide a novel method and an apparatus for masking images by utilizing the property of a doubly refracting substance as described above.

Another object of this invention is to make it possible to provide various modes of masking depending upon the relaitve angles between the optic axes of two optical polarizers and doubly polarizing plates or films by rotating the axes of the optical polarizers, with the doubly polarizing transparent plates or films interposed therebetween.

Another object of the present invention is to provide an apparatus which enables the operator to determine the position or area of an image to be masked while permitting the operator to observe the image in its entirety during the above-mentioned masking procedure.

Still another object of this invention is to provide a masking apparatus described with a small number of parts and in simple construction.

The present invention provides a method comprising placing two kinds of doubly refracting transparent plates between two optical polarizers in a light path for the same image, the doubly refracting transparent plates having optic axes thereof disposed at an angle of 45°, and rotating the optic axes of the two optical polarizers to set the optic axes of the polarizers at a right angle or in parallel with each other and at the same time to position the optic axis of one of the polarizers at an angle of 45° with the optic axis of one of the doubly refracting transparent plates whereby the image is partially masked. The apparatus of this invention comprises the two rotatable optical polarizers and two doubly refracting transparent plates interposed between the polarizers, the doubly refracting plates being placed in the light path for the same image with the optic axes thereof set at an angle of 45° with each other, the two polarizers being adapted to be rotated so that the optic axes thereof are set at a right angle or in parallel with each other, with the optic axis of one of the polarizers and the optic axis of one of the doubly refracting plates set at an angle of 45° with each other.

Thus, the present invention can be used for applications such as for reader-printers, teaching machines, display devices for images. When installed in the path of projecting light, the present apparatus enables a desired area of the image to be masked with great ease, further making it possible for the operator to determine the position or area of the image to be masked while permitting him to observe the whole image. This is not the case with conventional methods of masking wherein an opaque screen was used. Such masking procedure can be carried out without affecting the position determination. Thus the present invention finds versatile optical applications.

DESCRIPTION OF THE PREFERRED EMBODIMENT

Figure 1:
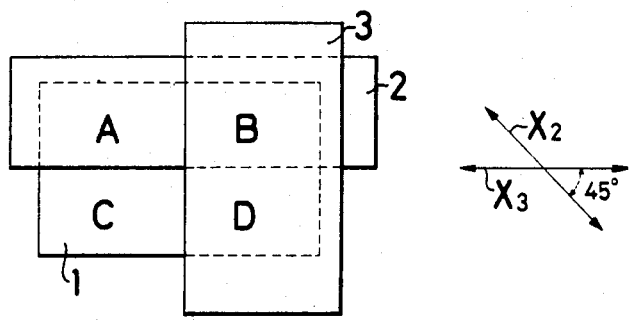
FIGS. 1 and 2 are diagrams illustrating the principle of arrangement of the present invention.

Referring to FIG. 1, a film 1 bears an image as recorded by variations in darkness or in colors in already known manner as by conventional photography. Doubly refracting transparent plates 2 and 3 are superposed on the film 1 with their optic axes $X_2$ and $X_3$ positioned at an angle of 45°. The refracting plates, varying in the direction of optical axis and in the shape in which the plates cover the image, are disposed for the same image.

The refracting plates and the film are then disposed between two optical polarizers. By setting the angle between the optic axes $Y_1$ and $Y_2$ of the polarizers in varying relationship with the optic axes $X_2$ and $X_3$ of the doubly refracting plates as shown in FIGS. 2(a), (b), (c), (d) and (e), different views of the image are obtained.

More specifically, when the optic axis $Y_1$ is positioned in the same direction as the optic axis $X_2$ and the optic axis $Y_2$ in the same direction as the optic axis $X_3$, the doubly refracting transparent plates exert no influence on the masking property of the optical polarizers, so that brightness of the image is determined only depending upon the property of the polarizers and the image in areas A, B, C and D look almost alike in brightness.

When the optic axes $Y_1$ and $Y_2$ of the optical polarizers are at a right angle with each other as seen in FIG. 2(b), the doubly refracting plate 3 whose optic axis $X_3$ is in parallel with the optic axis $Y_2$ of the optical polarizer produces no effect on the light interception of the optical polarizers, whereas the doubly refracting plate 2 whose optic axis $X_2$ is at 45° with the axis $Y_1$ of the optical polarizer permits transmission of light in spite of the masking property of the polarizers. Accordingly, the light passes through the areas A and B where the doubly refracting plate 2 is present, but is blocked over the areas C and D which are not covered with the refracting plate 2.

When the axes $Y_1$ and $Y_2$ are parallel as seen in FIG. 2(c), the areas where the doubly refracting plate 2 is present are masked which plate has the optic axis $X_2$ positioned at 45° with the optic axis $Y_1$. Thus the upper half of the image is masked. Further in the case where the optic axis $Y_1$ and the optic axis $X_3$ are at 45° and the optic axes $Y_1$ and $Y_2$ of the optical polarizers are positioned at a right angle as shown in FIG. 2(d), the left half of the image will be masked. If the optic axis $Y_1$ and optic axis $X_3$ are at 45° as shown in FIG. 2(e) and $Y_1$ and $Y_2$ are in parallel, the right half of the image will be masked.

Figure 2:
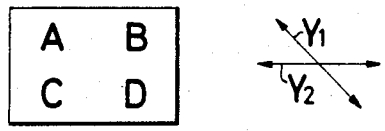
Figure 2:
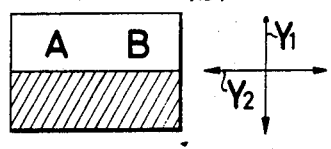
Figure 2:
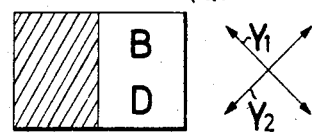
Figure 2:
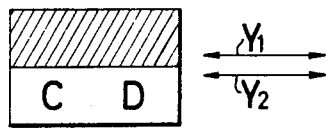
Figure 2:
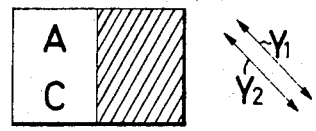
Figure 3:
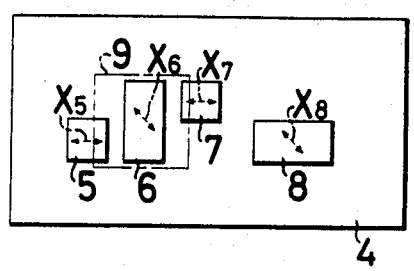
FIG. 3 is a diagram illustrating the principle of arrangement of doubly refracting transparent plates.

FIG. 3 shows an arrangement in which doubly refracting transparent films 5, 6, 7, 8 of desired shapes are applied to a transparent plate 4 free from double refraction, the optic axes $X_5$, $X_6$, $X_7$, $X_8$ being so positioned that the optical axes of adjacent doubly refracting transparent films are at 45° with each other. When the arrangement is placed between two optical polarizers disposed in front of an image, various modes of masking can be achieved depending upon the relative angle between the optic axes of the polarizers and the doubly refracting transparent films. Thus, it is possible to mask not only half the area of the image as seen in FIGS. 1 and 2 but also more localized areas, and such masking is achieved with great ease only by sliding movement.

For example, where the optic axes of the optical polarizers are positioned in the state of FIG. 2(b), the area covered with the doubly refracting transparent film 6 or 8 alone can be seen, while in the state of FIG. 2(d), the area covered with doubly refracting transparent film 5 or 7 alone can be seen. Supposing that the size of the image is defined by a rectangle 9 shown in a one-dotted chain line in the drawing. When the optic axes of the optical polarizers are positioned at a right angle with each other as indicated at $Y_1$ and $Y_2$ in FIG. 2(b) so as to allow the light to pass through the area 6 alone, the optic axes of the doubly refracting plates 5, 7 and the optical axis $Y_1$ are at 90° since the optic axes of adjacent doubly refracting transparent films are at 45° with each other. Therefore $2\theta$ in Equation 1 is 180°, the areas 5 and 7 thus being in masked state. With respect to adjacent doubly refracting plates of different kinds shown in FIG. 3, if the optic axis of a optical polarizer is positioned at 45° with the axis of one of the refracting plates, the axis of the optical polarizer will be at 0° or 90° with the optic axis of the other refracting plate, with the result that the latter exerts no influence on the optical polarizer. Considering that the doubly refracting materials different in the direction of the optic axis are disposed on the same image in accordance with the arrangement of FIG. 3, it will be understood that such arrangement is based upon the same principle as the arrangement shown in FIG. 1. Thus, it is possible to see only the area 6 independently of the other areas within the range of the image 9. If the doubly refracting transparent films 5, 6, 7 and 8 are framed along the peripheries thereof, the masking areas can be clearly identified beforehand during the procedure to be described later.

Figure 4:
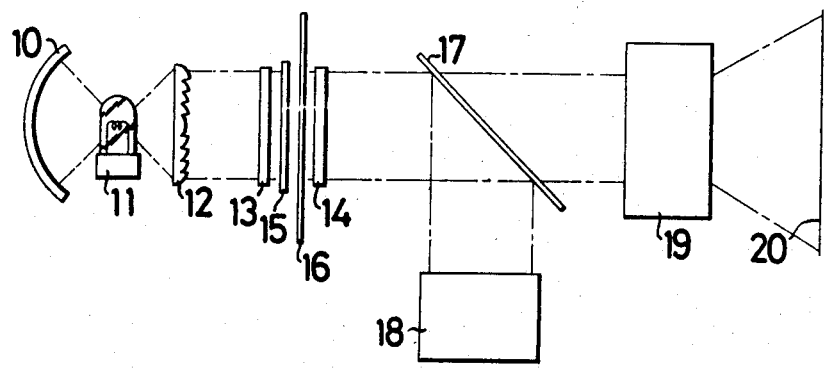
FIG. 4 is a diagram showing the construction of an apparatus embodying the present invention.

FIG. 4 illustrates an embodiment in which the foregoing principle of this invention is applied to a reader-printer. In the drawing, a reflecting mirror 10, a light source 11 and a lens 12 constitute a light source unit for providing a parallel or converging beam. Optical polarizers 13 and 14 are rotatably supported on known means (not shown). Indicated at 15 is a film on which images to be projected are recorded in terms of variations in darkness by photographic method; at 16, a glass plate coated with doubly refracting transparent films as shown in FIG. 3 and framed along their peripheries; and at 17, a semi-transmitting mirror or movable reflecting mirror whereby a beam passing through the polarizer 14 is divided into two, one part thereof being led to a reader station 18, the other part being directed to an exposure station 20 for printing by way of a known optical system for copying.

In the arrangement described above, the optic axes of the polarizers 13 and 14 are first set in the same direction as the optic axes of the doubly reflecting transparent films on the glass plate 16 respectively as in the case with $Y_1$ and $Y_2$ in FIG. 2(a), and the glass plate 16 is then moved so as to cover, for example, only an area of the images to be printed with a doubly refracting transparent film 6 as shown in FIG. 3. Since the optic axes of the polarizers 13 and 14 are set in the same direction as those of the respective doubly refracting transparent film as already described, the images will not be masked. Moreover, because the doubly refracting transparent films are framed, the desired area for projection can be covered with extreme ease.

Then the polarizer 13 is rotated to set its optic axis at the position as shown in FIG. 2(b), whereby only the area covered with the doubly refracting transparent film 6 is projected with the other areas masked. When a printing mechanism is actuated in this state, the desired area alone can be printed.

When the optic axes of the polarizers 13 and 14 are further set as shown in FIG. 2(c), the area covered with the film 6 alone will be masked. Either one of the polarizers may be rotated as desired relative to the respective doubly refracting transparent films shown in FIG. 3. The doubly refracting films may be provided with frames of different width and colors depending upon the direction of the optic axis.

In the case where the embodiment of FIG. 4 is substituted for a teaching machine, a semi-transmitting mirror may be used for the member indicated at 17, the reader station 18 may serve as an observation station for the teacher and the exposure station 20 may be used by the student for observation. The optical system 19 is further provided with a light intercepting means, whereby the teacher intercepts the projecting light to be incident on the observation station for student at first. The teacher may then set the doubly refracting transparent film for the desired image on the masked area and project the image onto the student's observation station. After explanation and alolwing the student to think over the problem, the teacher may rotate the polarizer for the student to watch all images. Thus, the present invention finds versatile applications also for educational purposes. In nearly the same mode as above, this invention can further be embodied as a display apparatus for images.

What is claimed is:

1. The method of selectively masking an image comprising positioning across the light path between a pair of spaced light polarizers an image bearing sheet and a pair of mutually partially overlapping doubly refracting members with their optical axes at 45° to each other and overlapping a part of said image bearing sheet and rotating said light polarizers between positions with their optical axes parallel and perpendicular to each other with at least one of said polarizers at an angle of 45° to the optical axis of one of said doubly refracting members.

2. The method of claim 1 wherein each of said doubly refracting members masks approximately one half of said image bearing sheet and are mutually overlapping for approximately one half their areas.

3. The method of claim 1 wherein said doubly refracting members are of different kinds.

4. The method as set forth in claim 1 wherein a transparent slide plate provided with a plurality of doubly refracting transparent members of desired sizes arranged thereon is moved to partially mask the image, the optic axes of adjacent doubly refracting members being positioned at 45° with each other.

5. An optical apparatus comprising a pair of spaced optical polarizers, an image bearing sheet extending across the light path between said polarizers and a pair of mutually partially overlapping doubly refracting transparent members with their optical axes at 45° to each other masking a part of said image, said pair of optical polarizers being adjustable between positions with their optical axis parallel and perpendicular to each other and with the optical axis of at least one of said polarizers being at an angle of 45° to the axis of one of said doubly refracting members.

6. The apparatus of claim 5 wherein each of said doubly refracting members masks approximately one half of said image bearing sheet, and are mutually overlapping for approximately one half their areas.

7. The apparatus of claim 5 wherein said doubly refracting members are of different kinds.

8. The apparatus as set forth in claim 5 wherein each of said doubly refracting members is provided with a frame along its periphery.

9. The apparatus as set forth in claim 5 wherein said doubly refracting members are provided along the peripheries thereof with frames colored in different colors depending upon the direction of the optic axes of said doubly refracting members.

References Cited

UNITED STATES PATENTS

| | | | |
|---|---|---|---|
| 3,453,037 | 7/1969 | Middleton, Jr., et al. | 350—159 |
| 2,844,899 | 7/1958 | Guida | 350—153 |
| 3,089,802 | 5/1963 | Coffman et al. | 350—157 |
| 3,415,590 | 12/1968 | Adler | 350—157 |
| 2,165,974 | 7/1939 | Land | 350—157 |

DAVID SCHONBERG, Primary Examiner

P. R. MILLER, Assistant Examiner

U.S. Cl. X.R.

350—153, 159

UNITED STATES PATENT OFFICE
CERTIFICATE OF CORRECTION

Patent No. 3,671,104          Dated June 20, 1972

Inventor(s) Kuniki Seino

It is certified that error appears in the above-identified patent and that said Letters Patent are hereby corrected as shown below:

-- [30] Foreign Application Priority Data

November 25, 1969  Japan..............44-94542 --

Signed and sealed this 10th day of October 1972.

(SEAL)
Attest:

EDWARD M. FLETCHER, JR.          ROBERT GOTTSCHALK
Attesting Officer                Commissioner of Patents